US011986425B2

(12) United States Patent
Doppler et al.

(10) Patent No.: US 11,986,425 B2
(45) Date of Patent: May 21, 2024

(54) DEVICE FOR ORIENTING A PLATFORM, SYSTEM AND PATIENT SUPPORT

(71) Applicant: Ewellix AB, Goeteborg (SE)

(72) Inventors: Manuel Doppler, Liestal (CH); Martin Voegelin, Liestal (CH)

(73) Assignee: Ewellix AB, Goeteborg (SE)

( * ) Notice: Subject to any disclaimer, the term of this patent is extended or adjusted under 35 U.S.C. 154(b) by 91 days.

(21) Appl. No.: 17/572,125

(22) Filed: Jan. 10, 2022

(65) Prior Publication Data

US 2022/0218547 A1 Jul. 14, 2022

(30) Foreign Application Priority Data

Jan. 11, 2021 (DE) ..................... 10 2021 100 312.1

(51) Int. Cl.
*A61G 13/04* (2006.01)
*A61G 13/10* (2006.01)

(52) U.S. Cl.
CPC ............. *A61G 13/04* (2013.01); *A61G 13/10* (2013.01)

(58) Field of Classification Search
CPC ........ A61G 13/04; A61G 13/10; A61G 13/06; A61G 13/08
See application file for complete search history.

(56) References Cited

U.S. PATENT DOCUMENTS

| | | | | |
|---|---|---|---|---|
| 5,528,782 | A * | 6/1996 | Pfeuffer | A61G 13/04 5/607 |
| 5,621,933 | A * | 4/1997 | Knapp | B66F 7/16 5/607 |
| 6,681,423 | B2 | 1/2004 | Zachrisson | |
| 7,694,366 | B2 * | 4/2010 | Koch | A61G 13/06 5/607 |
| 8,800,983 | B2 | 8/2014 | Koch et al. | |
| 10,835,437 | B2 | 11/2020 | Revenus | |
| 2005/0015878 | A1 | 1/2005 | Bannister et al. | |
| 2016/0000620 | A1 | 1/2016 | Koch | |
| 2018/0193216 | A1 * | 7/2018 | Soltermann | A61G 13/06 |
| 2020/0345571 | A1 * | 11/2020 | Clayton | A61G 13/06 |

FOREIGN PATENT DOCUMENTS

| | | | |
|---|---|---|---|
| CN | 107205876 | A | 9/2017 |
| CN | 110882108 | A | 3/2020 |
| CN | 110882123 | A | 3/2020 |
| CN | 211723836 | U | 10/2020 |
| DE | 60122299 | T2 | 9/2007 |
| DE | 102011000628 | A1 | 8/2012 |
| WO | 2019043155 | A1 | 3/2019 |

* cited by examiner

*Primary Examiner* — Fredrick C Conley
(74) *Attorney, Agent, or Firm* — Laurence A. Greenberg; Werner H. Stemer; Ralph E. Locher

(57) ABSTRACT

A device for orienting a platform, and a system having such a device, and a patient support having such a system. A support unit supports a load carried by the platform. Two actuators are arranged on mutually opposite sides of the support unit, and each of the actuators can be connected in articulated fashion to the platform at a respective support point. The actuators are configured to move the support points relative to the support unit independently of one another and to support the entire load carried by the platform on the support unit.

16 Claims, 3 Drawing Sheets

DEVICE FOR ORIENTING A PLATFORM, SYSTEM AND PATIENT SUPPORT

CROSS-REFERENCE TO RELATED APPLICATION

This application claims the priority, under 35 U.S.C. § 119, of German Patent Application DE 10 2021 100 312.1, filed Jan. 11, 2021; the prior application is herewith incorporated by reference in its entirety.

FIELD AND BACKGROUND OF THE INVENTION

The present invention concerns a device for orienting a platform, and a system having such a device, and a patient support having such a system.

Systems for orienting a load usually have at least one platform which is configured to carry the load. Substantially any loads can be mounted on the platform, for example chairs, beds, tools and/or similar. The platform is often mounted on a support unit, normally in the form of a column, via a joint. An actuator connected to the platform or the load mounted thereon, eccentrically relative to a tilt axis of the joint, allows, by extension and retraction of an actuating rod, tilting of the platform together with the load mounted thereon relative to the support unit about the tilt axis of the joint.

If the load is to be able to be tilted about not just one tilt axis, it is known to arrange a cardan joint between the support unit and the platform, which allows tilting about two axes standing orthogonally to one another. The cardan joint may be formed by two platforms, wherein an outer of the two platforms is mounted tiltably on an inner of the two platforms via a first joint, and the inner of the two platforms is mounted for tilting on the support element via a second joint. By means of a further actuator, the load can thus be tilted in two planes.

One application of such arrangements of a cardan joint and two actuators is for example for orienting patient tables, such as operating or examination tables. The cardan joint, mounted on a support unit formed as a jacking column, thus allows a tilt movement of the longitudinal axis of the table (Trendelenburg or anti-Trendelenburg movement), and independently thereof a tilt movement of the transverse axis of the table (lateral movement). At the same time, the patient table can easily be loaded in a low (loading) position, and then moved via the jacking column into a high working position, in which it can then usually also be tilted.

SUMMARY OF THE INVENTION

It is accordingly an object of the invention to provide a device for orienting a platform which overcomes the above-mentioned disadvantages of the heretofore-known devices and methods of this general type and which provides for a simplified the tilting of the load, in particular while saving installation space.

With the above and other objects in view there is provided, in accordance with the invention, a device for orienting a platform, with a support unit for supporting a load carried by the platform, the device comprising:

two actuators arranged on mutually opposite sides of the support unit;

wherein the actuators are connectible in articulated fashion to the platform at respective support points and the actuators are configured to move the support points relative to the support unit independently of one another and to support an entirety of the load that is carried by the platform on the support unit.

A device according to the invention for orienting a platform has an in particular vertically arranged support unit for supporting a load carried by the platform. According to the invention, two actuators are provided which are arranged on mutually opposite sides of the support unit, each of which actuators can be connected in articulated fashion to the otherwise preferably freestanding platform at a respective support point, and are configured to move the support points relative to the support unit independently of one another and to support the entire load carried by the platform on the support unit.

One aspect of the invention is based on the requirement to be able to support a platform for carrying a load at two support points, and in such a fashion that the platform is otherwise freestanding. Suitably, a respective actuator can be or is connected to the platform only at the two support points, so that the entire load carried by the platform can be supported on one support unit at the two support points. For this, the actuators are connected to the support unit on two mutually opposite sides of the support unit. When both actuators are maximally retracted, the platform and the load carried thereon are preferably oriented substantially horizontally. By extending one of the two actuators, a tilting of the platform and the load carried thereon towards the side of the support unit facing away from the activated actuator can be achieved. When both actuators are maximally extended, the platform and the load carried thereon are preferably also oriented substantially horizontally. Now by retracting one of the two actuators, a tilting towards the side of the support unit facing the activated actuator can be achieved.

By supporting the entire load carried by the platform by means of two actuators, one joint for pivotable mounting of the platform on the support unit may be omitted. Accordingly, it is possible to save installation space, namely the clear height necessary for activation of the joint, between the platform and the upper end of the support unit. The device according to the invention is accordingly constructed more compactly than conventional devices.

The support unit is suitably configured as a jacking column which is designed to move the platform and the load carried thereon in the vertical. Accordingly, the jacking column can move the platform and load carried thereon from a loading position in which the jacking column is completely retracted, to a working position in which the jacking column is at least partially extended, and for example the load carried by the platform is easily accessible to a standing person. By means of the two actuators, the platform situated in the working position and the load carried thereon can be tilted in one plane, in particular about one of the two support points.

The support of the entire load carried by the platform by means of precisely two mutually opposite actuators is also advantageous with respect to the positioning of the platform and the load carried thereon in a working position. In addition to the height possible with the jacking column maximally extended, an additional lift can be generated by at least partial extension of the two actuators. With the same jacking column, the load can therefore be raised by means of the two actuators further than with an arrangement of a joint and an actuator arranged eccentrically thereto.

In a preferred embodiment, the device is configured to guide an in particular translational movement generated by a first of the two actuators. The device may for example be configured to keep a constant orientation of the first actuator relative to the support unit. In this way, a rectilinear movement of the support point assigned to the first actuator relative to the support unit can be ensured. By guiding the movement generated by the first actuator, thus in particular a high stability of the device, in particular the platform, may be achieved.

In order to be able to guide the movement precisely on a predefined path, suitably a guide is provided which is mounted on the support unit, in particular between the support unit and a first of the two actuators. Preferably, the guide is configured to guide a part of a first of the two actuators which in particular is movable relative to the support unit and which can be or is connected to the platform via one of the support points. The guide may for example be configured to guide a movement of an actuating rod of the first actuator which can be moved relative to the support unit. Alternatively, the guide may be configured to guide a movement of a drive segment of the first actuator which can be moved relative to the support unit.

In a further preferred embodiment, the guide is configured as a rail guide with at least one guide rail and a slide which is movable thereon and in particular is actively connected to the at least one guide rail. Preferably, the at least one rail is here mounted on the support unit, in particular on a side face. Further preferably, the slide is rigidly connected to the first of the two actuators. The slide may for example be rigidly connected to the part of the first actuator which can be or is connected to the platform via one of the support points, in particular to the drive segment which is movable relative to the support unit. Because of the design as a rail guide, the guide can achieve a particularly high stability of the device, in particular the platform. The guide configured as a rail guide may in particular absorb or receive bending moments and/or other moments acting on the platform without the platform yielding. Accordingly, the guide allows a particularly precise and stable positioning and orientation of the platform and the load carried thereon.

In a further preferred embodiment, the first of the two actuators is configured to move its assigned support point parallel to a longitudinal axis of the support unit. In this way, a lateral movement of the platform can be avoided. Accordingly, the platform can be positioned and oriented precisely.

In a further preferred embodiment, a second of the two actuators is mounted in articulated fashion on the support unit. The second actuator may be connected to the support unit for example via a support joint, the tilt axis of which runs perpendicular to the longitudinal axis of the support unit. In this way, the second actuator may be mounted so as to be tiltable relative to the longitudinal axis of the support unit. Accordingly, the second actuator may execute a deflection movement on a movement of the two support points during which the horizontal spacing of the two support points relative to one another changes.

In a further preferred embodiment, the two actuators at the support points can be or are connected to the platform via tilt hinges. The tilt axes of the tilt joints suitably run parallel to one another. Each of the two tilt joints may have a bolt defining the tilt axis, which engages for example through an eyelet of an actuating rod of an actuator or through a bore in a support fork attached to an actuator for supporting the platform. Via the tilt joints with mutually parallel tilt axes, the platform may firstly be held stable and secondly tilted in a plane, namely about one of the two tilt axes in each case. In particular, in a maximally retracted position, the platform may thus pivot about the upper end of the support unit without the platform colliding with the support unit.

The tilt joints are preferably arranged with a joint spacing from one another which is greater than a diameter of the support unit. This allows the platform to be lowered until an upper end of the support unit lies between the two tilt joints, in particular until the platform or the load carried thereon is supported on an end side of the support unit facing the platform.

In a further preferred embodiment, an actuating rod of a first of the two actuators is rigidly connected to the support unit. Suitably, a drive segment of this actuator is movable relative to the support unit, in particular by an extension of the actuating rod out of the drive segment. In this way, the drive segment of the first actuator may be lifted by pressing against the rigid connection of the actuating rod to the support unit. Preferably, the drive segment is here guided by the guide. Particularly preferably, the slide then travels on the at least one guide rail. The rigid connection of the actuating rod with the support unit allows the drive segment to be arranged directly below the platform, irrespective of the position of the first actuator. The installation space required by the first actuator may thus be substantially limited to the region directly below the platform.

In a further preferred embodiment, a first of the two actuators can be or is connected to the platform in articulated fashion at its assigned support point via a support fork comprising two mutually parallel support tines. Suitably, the actuator is at least partially arranged between the support tines which are preferably formed at least partially plate-like. It is preferred if, in particular, the drive segment of the first actuator is arranged between the support tines. With this arrangement, an additional protection of the actuator, in particular the drive segment, can be achieved.

In a further preferred embodiment, the first of the two actuators in a fully retracted state is arranged completely between the support tines. In this way, on loading of the platform, the rigid connection between the actuator and the support unit can also be effectively protected.

Retraction or extension of an actuator means retraction or extension of an actuating rod into or from the actuator, in particular into or from a drive segment of the actuator. A fully retracted or extended actuator, or an actuator in a fully retracted or extended state, is accordingly an actuator of which the actuating rod is fully retracted into or fully extended out of the drive segment.

In a further preferred embodiment, a second of the two actuators has an actuating rod which can be or is connected to the platform, and a drive segment through which the actuating rod can fully extend. Accordingly, the drive segment may be designed to be short, in particular shorter than the actuating rod, which allows a further saving of installation space.

In a further preferred embodiment, the two actuators are configured so as to support the platform in a horizontal orientation in a support position, in particular in a fully retracted state of the two actuators, on an end side of the support unit facing the two support points, in particular the platform. In other words, the two actuators are preferably arranged such that in the support position, the clear height between the inside of the support unit and the platform disappears. In this way, firstly the platform can be brought into a particularly low position, i.e., a particularly low loading position of the device can be achieved. Secondly, a particularly stable positioning of the platform is thus possible, for example for loading purposes.

In a further preferred embodiment, a damper arrangement is arranged on the end side of the support unit facing the two support points, in particular the platform. For example, elastic damping elements such as rubber dampers may be arranged on the end side. In this way, when the two actuators are fully retracted, the platform can be gently supported on the end side.

A system according to the invention for orienting a load comprises a platform for carrying the load and a device according to the invention. Suitably, each of the two actuators of the device is connected to the platform in articulated fashion at a respective one of the two support points.

A patient support according to the invention, in particular a patient table or chair, has a system according to the invention and a support structure, in particular a lying surface or a seating surface, which is mounted on the platform. By means of the device, the support structure can be brought into a particularly low loading position and thus loaded, such as loaded with a patient, particularly comfortably in a manner requiring little force. At the same time, the support structure can be brought into a particularly high working position and thus comfortable and economic working is possible even with particularly large persons on the patient support.

The invention is explained in more detail below with reference to figures. Where suitable, elements with the same function carry the same reference signs. The invention is not restricted to the exemplary embodiments depicted in the figures—also not with respect to functional features. The description above and the description of the figures which follows contain numerous features which are shown in the dependent subclaims, in some cases combined into groups. These features, together with all the features disclosed above and in the following description of figures, may be considered individually and also combined into suitable further combinations by the person skilled in the art. In particular, all cited features may be used alone and combined in any suitable combination with the device according to the invention, the system according to the invention and the patient support according to the invention.

Other features which are considered as characteristic for the invention are set forth in the appended claims.

Although the invention is illustrated and described herein as embodied in device for orienting a platform, and system and patient support, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
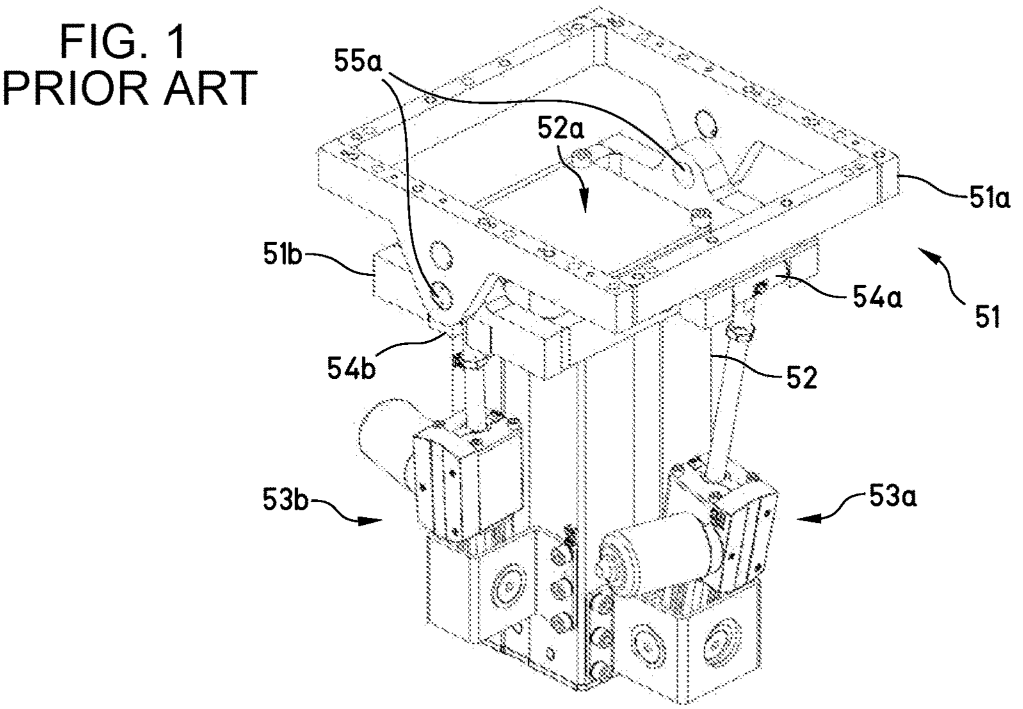
FIG. 1 PRIOR ART
FIG. 1 is a perspective view of a prior art system for orienting a load.

Referring now to the figures of the drawing in detail and first, in particular, to FIG. 1 thereof, there is shown a prior art system 50 for orienting a load. The system 50 has a platform 51 for carrying the load, and a support unit 52 for supporting the load carried by the platform 51. By means of a first actuator 53*a* and a second actuator 53*b*, which are mounted on two adjacent sides of the support unit 52 and connected in articulated fashion to the platform 51 via a respective coupling joint 54*a*, 54*b*, the platform 51 can be tilted about two tilt axes which are orthogonal to one another.

The tilt axes are defined by a first tilt joint 55*a* and a second tilt joint, which is not visible in the perspective of FIG. 1. The first tilt joint 55*a* here connects an outer part 51*a* of the platform 51 to an inner part 51*b* of the platform 51 in articulated fashion, such that the inner part 51*b* and the outer part 51*a* are mounted so as to be tiltable relative to one another. The second tilt joint connects the inner part 51*b* to the support unit 52 in articulated fashion such that the first tilt joint 55*a* together with the second tilt joint forms a cardan joint.

In order to allow a tilt movement of the outer part 51*a* relative to the inner part 51*b*, and/or of the inner part 51*b* relative to the support unit 52, a clear height is provided between an upper end side 52*a* of the support unit 52 facing the platform 51 and at least the outer part 51*a*. Without this clear height, a load, e.g. a table plate mounted on the platform 51, could not be tilted out of the horizontal at the edges which delimit the end side 52*a*.

Figure 2:
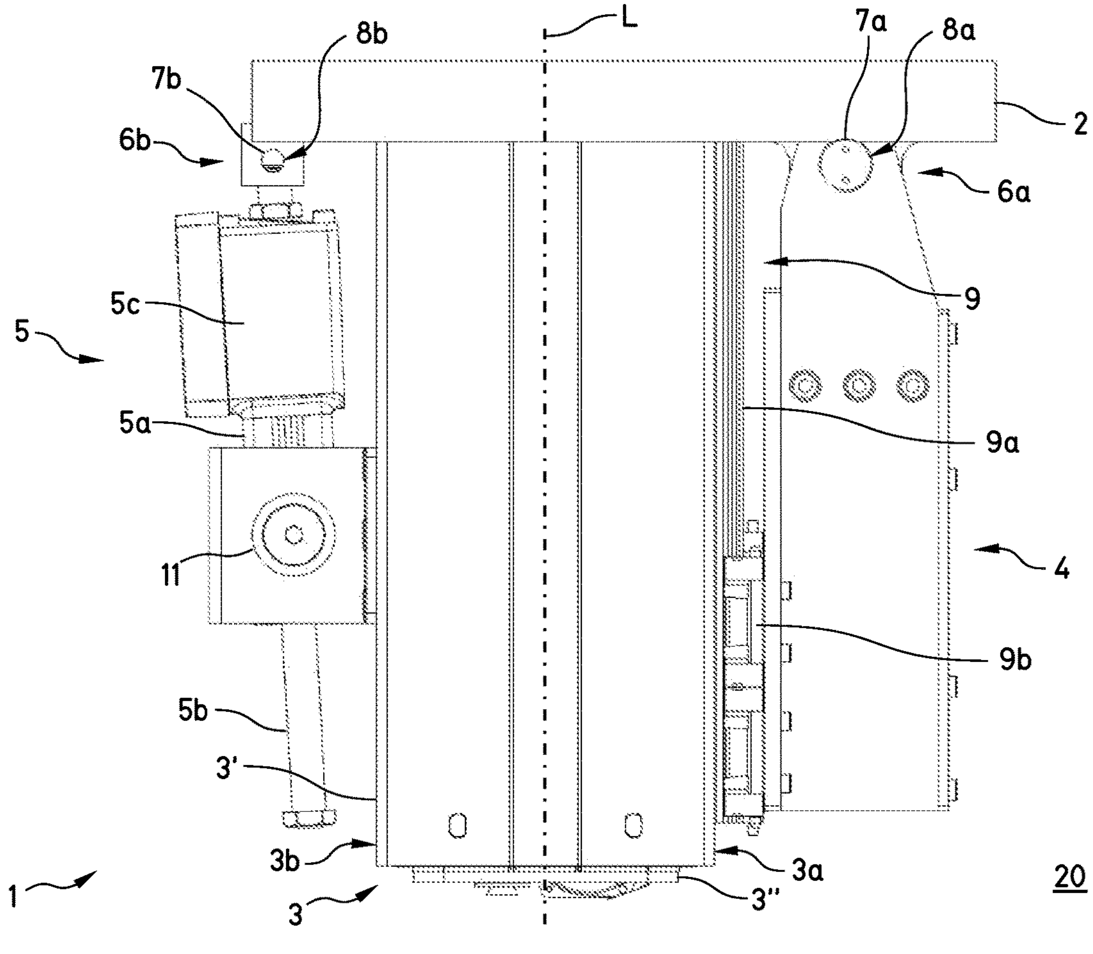
FIG. 2 is a sideview of an exemplary embodiment of a system for orienting a load, wherein a device of the system is in a loading position.

FIG. 2 shows an example of a system 20 for orienting a load. The system 20 comprises a platform 2 for carrying the load, and a device 1 with a support unit 3 for supporting the load carried by the platform 2. In the example shown, the device 1 is in a loading position.

A first actuator 4 and a second actuator 5 are arranged on two mutually opposite sides 3*a*, 3*b* of the support unit 3, and are connected in articulated fashion to the otherwise free-standing platform 2, respectively at a first support point 6*a* and at a second support point 6*b* which has some play. The actuators 4, 5 are configured to move the support points 6*a*, 6*b* independently of one another relative to the support unit 3, and to support the entire load carried by the platform 2 on the support unit 3.

The actuators 4, 5, which in principle may be driven electrically or hydraulically, are preferably connected to the platform 2 at the support points 6*a*, 6*b* via a first tilt joint 7*a* and a second joint 7*b* respectively. The tilt axes 8*a*, 8*b* of the tilt joints 7*a*, 7*b* run parallel to one another, and in the example shown perpendicularly to the figure plane and to a longitudinal axis L of the support unit 3. By activating one of the two actuators 4, 5, the platform 2 and hence the load carried thereon may therefore be tilted out of the horizontal position shown in FIG. 2. The platform 2 tilts about the respective tilt axis 8*a*, 8*b* arranged on the side 3*a*, 3*b* facing away from the activated actuator 4, 5 (see FIGS. 3A and 3B, and 5A and 5B). If for example the first actuator 4 is activated, the platform 2 tilts about the tilt axis 8*b* defined by the second tilt joint 7*b*. If however the second actuator 5 is activated, the platform 2 tilts about the tilt axis 8*a* defined by the first tilt joint 7*a*.

In order to be able to support the platform 2 in stable fashion, the device 1 has a guide 9 in the form of a rail guide with guide rails 9*a* and a slide 9*b* which is mounted movably thereon. By means of the guide 9, the movement of the first support point 6*a* can be guided on activation of the first actuator 4. In particular, the movement of the first support point 6*a* can be restricted to an exclusively vertical movement parallel to the longitudinal axis L.

The guide rails 9*a* are mounted on the first side 3*a* of the support unit 3. The slide 9*b* is mounted at least on a part of the first actuator 4. On activation of the first actuator 4, therefore at least a part of the first actuator 4 moves with the slide 9*b* along the guide rails 9*a* (see also FIGS. 3A, 4, 5A and 5B).

Because the horizontal distance between the two support points 6*a*, 6*b* varies when the platform 2 is tilted about one of the two tilt axis 8*a*, 8*b*, the second actuator 5 is connected in articulated fashion to the support unit 3. In the present example, a support joint 11 is mounted on the support unit 3 on the second side 3*b* of the support unit 3, by means of which joint the second actuator 5 can be tilted about a tilt axis which runs perpendicularly to the longitudinal axis L of the support unit 3 and in particular parallel to the tilt axes 8*a*, 8*b*. In this way, the second actuator 5 can compensate for a lateral displacement of the second support point 6*b* caused by the tilting of the platform 2.

The second actuator 5 has a drive segment 5*a* which suitably comprises an electric drive 5*c* of the second actuator 5. The drive segment 5*a* is arranged in the region of the upper end of the support unit 3, and for example attached pivotably to the support joint 11. A movable actuating rod 5B, which is in particular extendable out of the drive segment 5*a*, of the second actuator 5 can pass completely through the drive segment 5*a*. In the fully retracted state of the second actuator 5 shown in FIG. 2, the actuating rod 5*b* protrudes for example out of the drive segment 5*a* on the side of the second actuator 5 facing away from the platform 2. In this way, the drive segment 5*a* may be designed to be shorter and installation space can be saved.

In the present example, the support unit 3 is configured as a jacking column in order to be able to position the platform 2 and the load carried thereon vertically. The jacking column has several, in the present example two, column segments 3', 3" which can be moved telescopically relative to one another. The actuators 4, 5 are mounted on the outsides 3*a*, 3*b* of an outer column segment 3'. In the loading position shown here, an inner column segment 3" is received at least substantially completely by the outer column segment 3'. In other words, the jacking column is completely retracted. This facilitates the arrangement of a load on the platform 2.

In the loading position of the device 1, the platform 2 is suitably oriented horizontally. Here, the platform 2 is preferably in a supported position in which it is supported on the support unit 3. In other words, in the supported position, the platform 2 can rest on the support unit 3. In this way, in the supported position, an even greater stability of the device 1 can be achieved.

Figure 3A:
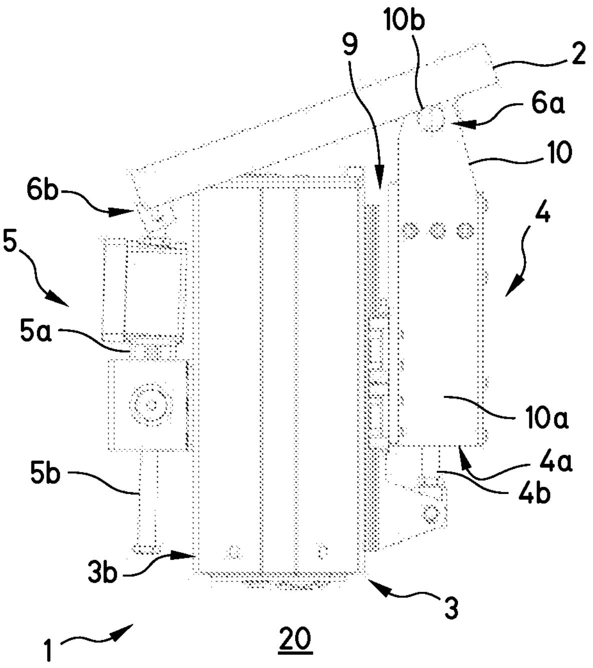
FIG. 3A shows the system from FIG. 2, wherein the device is in a first tilt position.

FIG. 3A shows the system 20 from FIG. 2, wherein the device 1 is in a first tilt position. In the first tilt position, the platform 2 is tilted towards the second side 3*b* of the support unit 3. An actuating rod 4*b* is here partially extended out of a drive segment 4*a* of the first actuator 4. On a side of the drive segment 5*a* facing the second support point 6*b*, the actuating rod 5*b* of the second actuator 5 is however fully retracted, so that the second support point 6*b* is lowered relative to the first support point 6*a*.

The drive segment 4*a* of the first actuator 4 is here arranged between two support tines 10*a* of a support fork 10 which, at an upper end facing the platform 2, is connected to the platform 2 at the first support point 6*a*. The support fork 10 may for example be connected to the platform 2 via a bolt 10*b* which passes through a bore in the support tines 10*a*. Forces acting horizontally on the platform 2 and corresponding bending moments may thus be absorbed by the guide 9 without acting on the first actuator 4.

As already indicated, the actuating rod 4*b* of the first actuator 4 can be extended downward out of the drive segment 4*a*, i.e., on a side facing away from the first fixing point 6*a*. In this way, the drive segment 4*a* together with the support fork 10 may be pushed upward. This is advantageous since the installation space required by the first actuator 4 is thus always arranged favorably with respect to space in a region directly below the platform 2.

Figure 3B:
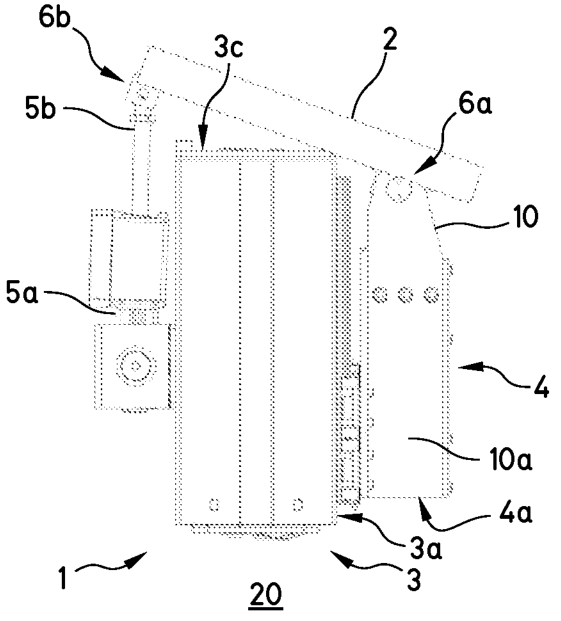
FIG. 3B shows the system from FIG. 2, wherein the device is in a second tilt position.

FIG. 3B shows the system 20 from FIG. 2, wherein the device 1 is in a second tilt position. In the second tilt position, the platform 2 is tilted towards the first side 3*a* of the support unit 3. The actuating rod 5*b* of the second actuator 5 is here extended partially upward out of the drive segment 5*a* of the second actuator 5, i.e., on a side facing the second support point 6*b*. The actuating rod (not visible in FIG. 3B) of the first actuator 4 is however fully retracted into the drive segment 4*a* of the first actuator 4, so that the first support point 6*a* is lowered relative to the second support point 6*b*.

As already clearly shown in FIG. 2, the entire actuating rod of the first actuator 4 is here arranged between the support tines 10*a* of the support fork 10. Both in the loading position and in the second tilt position, the connection between the actuating rod of the first actuator 4 and the support unit 3 is thus protected by the support fork 10.

Because the platform 2 is supported only at the two support points 6*a*, 6*b*, on activation of one of the actuators 4, 5, the platform 2 pivots about the edge of an end side 3*c* of the support unit 3 facing the platform 2. Even if one of the actuators 4, 5 is fully retracted, i.e., the respective actuating rod 4*b*, 5*b* is completely retracted into the corresponding drive segment 4*a*, 5*a*, the platform 2 does not therefore collide with one of these edges.

Figure 4:
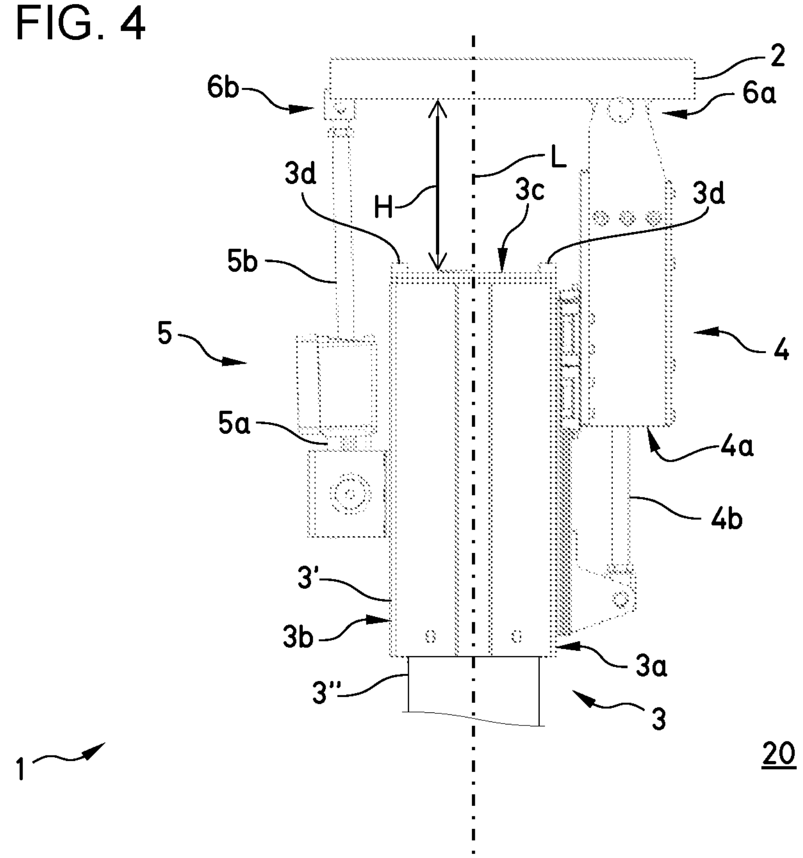
FIG. 4 shows an exemplary embodiment of a system for orienting a load, wherein a device of the system is in a working position.

FIG. 4 shows an example of a system 20 for orienting a load. Similar to the example shown in FIG. 2, the system 20 has a platform 2 for carrying the load, and a device 1 for orienting the platform 2. The platform 2 is here supported on two support points 6*a*, 6*b*. The device 1 has a support unit 3 configured as a jacking column. Two actuators 4, 5 are arranged on two mutually opposite sides 3*a*, 3*b* of the support unit 3, by means of which actuators the support points 6*a*, 6*b* can be moved independently of one another relative to the support unit 3, in particular substantially parallel to a longitudinal axis L of the support unit 3. Suitably, the actuators 4, 5 are here configured for moving a respective actuating rod 4*b*, 5*b* relative to a drive segment 4*a*, 5*b*. In the exemplary working position of the device 1 shown, the actuating rods 4*b*, 5*b* are maximally extended out of the drive segments 4*a*, 5*a*. In this way, a maximum clear height H is achieved between an end side 3*c* of the support unit 3 facing the platform 2, and the platform 2.

The lift corresponding to the maximum clear height H may be achieved in addition to the lift which can be achieved by the support unit 3 configured as a jacking column. The maximum achievable height of the platform 2 is thus not limited by the length of the support unit 3 with maximally extended column segments 3', 3". Rather, by means of the actuators 4, 5, in particular by a simultaneous activation of the two actuators 4, 5, the platform 2 may be raised even further. For the same length of column segments 3', 3" of the support unit 3, by means of the device 1 shown in FIG. 4, the platform 2 may thus be raised further than with a device in which a cardan joint is arranged between the support unit 3 and the platform 2 (see FIG. 1).

In FIG. 4, protrusions 3*d* are visible which are arranged on the end side 3*c*. The protrusions 3*d* may here be configured to support a part of the load carried by the platform 2 when the platform 2 is in the loading position shown in FIG. 1, i.e., the two actuators 4, 5 or their actuating rods 4*b*, 5*b* are completely retracted. In this way it is possible firstly to relieve the load on the actuators 4, 5 in the loading position. At the same time, secondly the stability of the device 1 in the loading position may thus be increased.

The protrusions 3*d* may be formed for example by screws used to screw an end plate, forming the end side 3*c*, onto the outer column segment 3'.

Preferably, the protrusions 3*d* form a damper arrangement, by means of which the platform 2 may be supported particularly gently on the support unit 3. The protrusions 3*d* may be formed in particular by the elastic damping elements, for example rubber dampers.

Figure 5A:
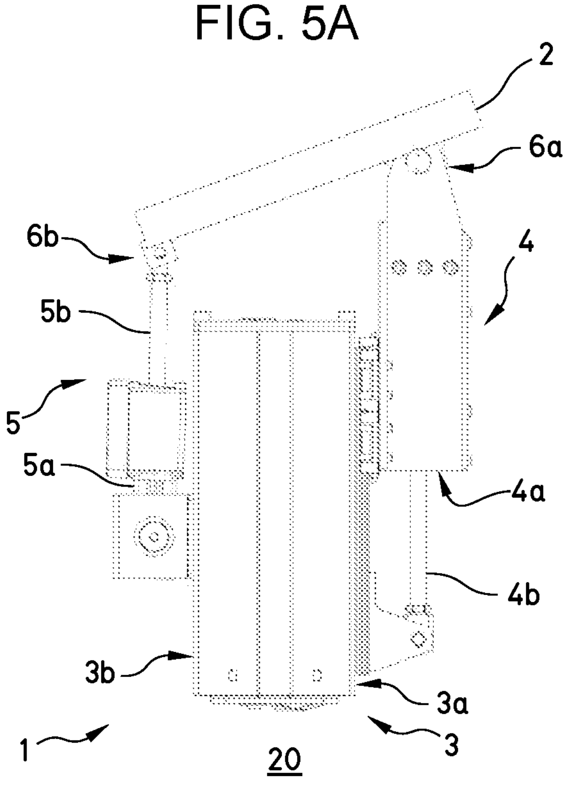
FIG. 5A shows the system from FIG. 4, wherein the device is in a first tilt position.

FIG. 5A shows the system 20 from FIG. 4, wherein the device 1 is in a first tilt position. In the first tilt position, the platform 2 is tilted towards the second side 3*b* of the support unit 3. The actuating rod 5*b* of the second actuator 5 is here partially retracted into the drive segment 5*a* of the second actuator 5, on a side of the drive segment 5*a* facing the second support point 6*b*. The actuating rod 4*b* of the first actuator 4 is however fully extended, so that the second support point 6*b* is lowered relative to the first support point 6*a*.

Figure 5B:
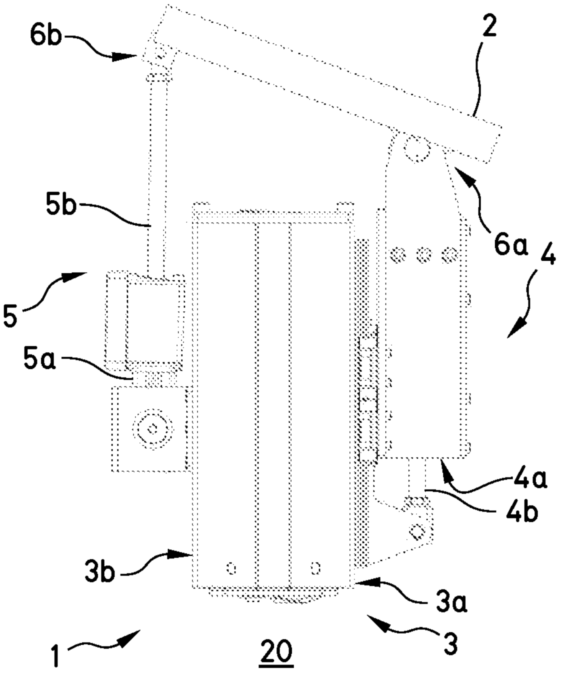
FIG. 5B shows the system from FIG. 4, wherein the device is in a second tilt position.

FIG. 5B shows the system 20 from FIG. 4, wherein the device 1 is in a second tilt position. In the second tilt position, the platform 2 is tilted towards the first side 3*a* of the support unit 3. The actuating rod 4*b* of the first actuator 4 is here partially retracted into the drive segment 4*a* of the first actuator 4. The actuating rod 5*b* of the second actuator 5 is however fully extended on a side of the drive segment 5*a* of the second actuator 5 facing the platform 2, so that the first support point 6*a* is lowered relative to the second support point 6*b*.

Figure 6:
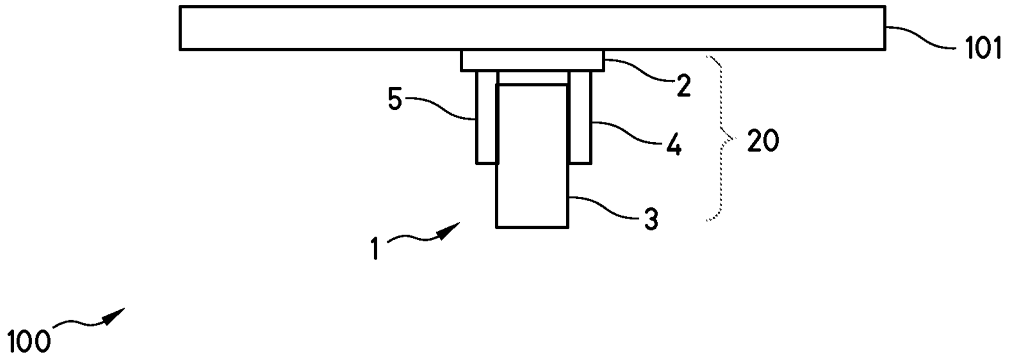
FIG. 6 is side view of an exemplary embodiment of a patient support configured as a patient table.

FIG. 6 shows an example of a patient support 100 configured as a patient table. The patient support 100 has a support structure 101 configured as a lying surface, and a system 20 for orienting a load, in particular the support structure 101. The patient support 100 may in particular be an operating or examination table.

The support structure 101 is here mounted on a platform 2 of the system. The platform 2 thus carries both the support structure 101 and a load deposited on the support structure 101, for example a patient. The entire load carried by the platform 2, which may be composed of the support structure 101 and the patient, is supported by two actuators 4, 5 on a support unit 3 of a device 1 for orienting the platform 2. The support unit 3 is preferably configured as a jacking column in order to be able to position the support structure 101 at a desired height. By means of the actuators 4, 5, in particular by activation of one of the two actuators 4, 5, the platform 2 and hence also the support structure 101 may be tilted out of the horizontal.

In another example (not shown), the patient support 100 may be configured as a patient chair. Here, the platform may carry a seating surface which can be oriented accordingly by means of the device 1.

The following is a summary list of reference numerals and the corresponding structure used in the above description of the invention:

1 Device
2 Platform
3 Support unit
3*a*, 3*b* Side
3*c* End side
3*d* Protrusion
3' Outer column segment
3" Inner column segment
4 First actuator
4*a* Drive segment
4*b* Actuating rod
5 Second actuator
5*a* Drive segment
5*b* Actuating rod
5*c* Drive
6*a*, 6*b* Support point
7*a*, 7*b* Tilt joint
8*a*, 8*b* Tilt axis
9 Guide
9*a* Guide rail
9*b* Slide
10 Support fork
10*a* Support tine
10*b* Bolt
11 Support joint
20 System
50 Conventional system
51 Platform
51*a* Outer part
51*b* Inner part
52 Support unit
52*a* End side
53*a*, 53*b* Actuator
54*a*, 54*b* Coupling joint
55*a* Tilt joint
100 Patient support
101 Support structure
L Longitudinal axis
H Clear height

The invention claimed is:

1. A device for orienting a platform, with a support unit for supporting a load carried by the platform, the device comprising:

two actuators arranged on mutually opposite sides of the support unit;

a guide mounted on the support unit, said guide arranged between the support unit and a first actuator of said two actuators and configured to guide a part of said first actuator of said two actuators; and said actuators being connectible in articulated fashion to the platform at respective support points and said actuators being configured to move said support points relative to the support unit independently of one another and to support an entirety of the load carried by the platform on the support unit.

2. The device according to claim 1, wherein the device is configured to guide a movement generated by said first actuator of said two actuators.

3. The device according to claim 1, wherein a second actuator of said two actuators has an actuating rod to be connected to the platform and a drive segment through which said actuating rod passes completely.

4. The device according to claim 1, wherein said guide is a rail guide with at least one guide rail and a slide which is movable on said guide rail.

5. The device according to claim 1, wherein said first actuator of said two actuators is configured to move a respectively assigned support point parallel to a longitudinal axis of the support unit.

6. The device according to claim 5, wherein a second actuator of said two actuators is articulated at the support unit.

7. The device according to claim 1, further comprising tilt hinges for connecting said two actuators to the platform at said support points, said tilt hinges having tilt axes that run parallel to one another.

8. The device according to claim 1, wherein said first actuator of said two actuators has an actuating rod that is rigidly connected to the support unit, and said first actuator has a drive segment that is movable relative to the support unit.

9. The device according to claim 1, further comprising a support fork for connecting said first actuator of said two actuators to the platform in articulated fashion at a respectively assigned support point, said support fork having two mutually parallel support tines and said first actuator being at least partially arranged between said support tines.

10. The device according to claim 1, wherein said two actuators are configured to support the platform in a horizontal orientation in a support position on an end side of the support unit facing said support points.

11. The device according to claim 10, further comprising a damper arrangement arranged on an end side of the support unit facing said support points.

12. A system for orienting a load, comprising a platform for carrying the load and a device according to claim 1 for supporting said platform.

13. A patient support, comprising a system according to claim 12 and a support structure mounted on the platform.

14. The patient support according to claim 13, wherein said support structure is a lying surface or a seating surface mounted on the platform.

15. The patient support according to claim 13 configured as a patient table or a patient chair.

16. A device for orienting a platform, with a support unit for supporting a load carried by the platform, the device comprising:

two actuators arranged on mutually opposite sides of the support unit;

said actuators being connectible in articulated fashion to the platform at respective support points and said actuators being configured to move said support points relative to the support unit independently of one another and to support an entirety of the load carried by the platform on the support unit;

a support fork for connecting a first actuator of said two actuators to the platform in articulated fashion at a respectively assigned support point, said support fork having two mutually parallel support tines and said first actuator being at least partially arranged between said support tines; and said first actuator, in a fully retracted state, is arranged completely between said support tines.

* * * * *